US009125086B2

(12) United States Patent
Okuyama

(10) Patent No.: US 9,125,086 B2
(45) Date of Patent: Sep. 1, 2015

(54) WIRELESS LAN COMMUNICATION DEVICE, WIRELESS LAN COMMUNICATION METHOD AND PROGRAM

(75) Inventor: Mariko Okuyama, Kawasaki (JP)

(73) Assignee: NEC CASIO MOBILE COMMUNICATIONS, LTD., Kanagawa (JP)

( * ) Notice: Subject to any disclaimer, the term of this patent is extended or adjusted under 35 U.S.C. 154(b) by 116 days.

(21) Appl. No.: 14/003,619

(22) PCT Filed: Feb. 2, 2012

(86) PCT No.: PCT/JP2012/000707
§ 371 (c)(1),
(2), (4) Date: Sep. 6, 2013

(87) PCT Pub. No.: WO2012/120772
PCT Pub. Date: Sep. 13, 2012

(65) Prior Publication Data
US 2013/0336113 A1 Dec. 19, 2013

(30) Foreign Application Priority Data
Mar. 7, 2011 (JP) .................................. 2011-049001

(51) Int. Cl.
| H04W 28/04 | (2009.01) |
| H04W 74/08 | (2009.01) |
| H04W 28/18 | (2009.01) |
| H04W 84/12 | (2009.01) |
| H04W 72/12 | (2009.01) |

(52) U.S. Cl.
CPC ........ *H04W 28/044* (2013.01); *H04W 74/0875* (2013.01); *H04W 28/18* (2013.01); *H04W 72/12* (2013.01); *H04W 84/12* (2013.01)

(58) Field of Classification Search
None
See application file for complete search history.

(56) References Cited

U.S. PATENT DOCUMENTS

| 7,978,636 B2 | 7/2011 | Gaur |
| 8,125,969 B2 | 2/2012 | Ji et al. |
| 8,509,129 B2 | 8/2013 | Deb et al. |

(Continued)

FOREIGN PATENT DOCUMENTS

| JP | 2005-012725 | 1/2005 |
| JP | 2006-211362 | 8/2006 |

(Continued)

OTHER PUBLICATIONS

Supplementary European Search Report dated Jul. 29, 2014 in corresponding European Patent Application No. 12755766.8.

(Continued)

*Primary Examiner* — Diane Lo
(74) *Attorney, Agent, or Firm* — Young & Thompson

(57) ABSTRACT

A wireless LAN communication device configured to carry out the priority control of an EDCA scheme includes a first determining section for determining access categories, a second determining section for determining a bandwidth occupancy rate for each access category, and a change section for dynamically changing parameters regarding the priority control for each category in accordance with determination results of the first and second determining sections. Accordingly, even when a mass of traffic exists in categories having the priority of the same class, the collision of packets in the traffic, the increase of the amount of delay, the reduction of throughput, and the like can be avoided.

8 Claims, 5 Drawing Sheets

(56) References Cited

U.S. PATENT DOCUMENTS

| | | |
|---|---|---|
| 2006/0045050 A1* | 3/2006 | Floros et al. ............... 370/332 |
| 2006/0126581 A1 | 6/2006 | Katsumata et al. |
| 2006/0215686 A1 | 9/2006 | Takeuchi |
| 2007/0258419 A1 | 11/2007 | Zhao et al. |
| 2008/0240049 A1 | 10/2008 | Gaur |
| 2009/0303908 A1 | 12/2009 | Deb et al. |
| 2010/0150116 A1 | 6/2010 | Ji et al. |
| 2010/0284380 A1* | 11/2010 | Banerjee et al. ........... 370/338 |

FOREIGN PATENT DOCUMENTS

| | | |
|---|---|---|
| JP | 2006-246030 | 9/2006 |
| JP | 2007-053548 | 3/2007 |
| JP | 2007-074210 | 3/2007 |
| JP | 2007-235782 | 9/2007 |
| JP | 2008-245278 | 10/2008 |
| JP | 2009-296579 | 12/2009 |

OTHER PUBLICATIONS

Kenichi Kawamura et al., "Technique for Dynamically Updating EDCA Access Parameters for WLANs", NTT Technical Review, vol. 5, No. 11, Nov. 1, 2007, pp. 1-5, XP002727118, retrieved Jul. 14, 2014 from the Internet: URL:https://www.ntt-review.jp/archive/ntttechnical.php?contents=ntr200711sf6.html.

International Search Report, PCT/JP2012/000707, Mar. 13, 2012.

* cited by examiner

FIG. 3

| AC | CWmin | CWmax | AIFSN | TXOP Limit |
|---|---|---|---|---|
| AC_VO | 3 | 7 | 7 | 0ms |
| AC_VI | 7 | 15 | 3 | 0ms |
| AC_BE | 15 | 1023 | 2 | 6.016ms |
| AC_BK | 15 | 1023 | 2 | 3.264ms | ly changing the QoS parameters (AIFS, CWmin, and CWmax).

WIRELESS LAN COMMUNICATION DEVICE, WIRELESS LAN COMMUNICATION METHOD AND PROGRAM

CROSS REFERENCE TO RELATED APPLICATIONS

This is a national stage of International Application No. PCT/JP2012/000707 filed Feb. 2, 2012, claiming priority based on Japanese Patent Application No. 2011-049001 filed Mar. 7, 2011, the entire contents of which are incorporated herein by reference.

TECHNICAL FIELD

The present invention relates to a wireless LAN communication device, a wireless LAN communication method and a program, which are used for a wireless LAN system, and more particularly, relates to a wireless LAN communication device, a wireless LAN communication method and a program, which carry out priority control of an EDCA (Enhanced Distributed Channel Access) scheme.

BACKGROUND ART

Wireless LAN systems are operated based on any of an ad hoc mode which is one-to-one connection and an infrastructure mode which is one-to-many connection centering on an access point. In particular, in the infrastructure mode, a plurality of terminals share one transmission channel (hereinafter merely referred to as channel), so that a data collision is likely to occur. In consideration of this, with respect to the wireless LAN system, priority control is made in such a manner that, first, the operating conditions of the channel are checked prior to the transmission of data (packets), and when the channel is not used, after being putting on standby for a predetermined time (AIFS), the data is transmitted after a lapse of a predetermined random time (referred to as a back-off time).

In the priority control, the data is transmitted after a lapse of "random time" for each terminal, so that simultaneous transmission is unlikely to occur, thereby substantially reducing the frequency of the data collision. The "random time" is referred to as contention window (CW). The CW is changed in accordance with the number of retransmissions, and its minimum is represented as CWmin, and its maximum is represented as CWmax. Information such as the AIFS and CW (CWmin, CWmax) above is referred to as a bandwidth control parameter, in general, as a QoS (Quality of Service) parameter.

On the other hand, with respect to the wireless LAN system, the communication of a best-effort scheme is carried out, and when communication is concentrated, real-time system communication, in particular, such as voice and images, is likely to be affected, whereby the interruption of the voice or the disruption of the images occurs. Therefore, according to IEEE 802.11e, the traffic in wireless sections is classified into priorities having four classes (AC: Access Category; hereinafter, merely referred to as a category), and appropriate QoS parameters are set for each category. The categories are exemplified by "voice" (AC_VO), "image" (AC_VI), "best-effort" (AC_BE), and "background" (AC_BK), wherein the order of priority is represented by AC_VO>AC_VI>AC_BE>AC_BK.

Accordingly, a right to use the channel is preferentially provided for the real-time system data such as the voice and images (AC_VO or AC_VI), rather than for other data (AC_BE or AC_BK), so that the interruption of the voice or the disruption of the images is prevented from occurring.

With respect to conventional technologies regarding the wireless LAN communication device which carries out the priority control for each category, the following technologies have been known.

<First Conventional Technology>

Patent Document 1 discloses the technology in which the impartiality of an upward/downward ratio is realized by dynamically changing the QoS parameters (AIFS, CWmin, and CWmax).

<Second Conventional Technology>

Patent Document 2 discloses the technology in which different CWmin and CWmax are set for the QoS parameters regarding a plurality of SSIDs.

<Third Conventional Technology>

Patent Document 3 discloses the technology in which the validity of data transmission request of the category (AC_VO) having the highest priority is determined, and invalid data transmission request is refused.

<Fourth Conventional Technology>

Patent Document 4 discloses the technology in which the priority control is made in accordance with each quality characteristic (suppression of traffic delay or maintenance of throughput characteristics) with respect to video conferences and video streams, out of applications which are classified into AC_VI.

<Fifth Conventional Technology>

Patent Document 5, for example, discloses the technology in which medical instrument like a DASH device (device used to collect patient monitoring data such as ECG, heart rate, and blood pressure) can obtain a QoS requirement which is different from that of CITRIX device (device used to perform remote observation for patient data) based on a patient monitoring requirement, so that the setting for at least one of MAC parameters of a specific node (terminal) of the medical instrument and the like is adapted in such a manner as to satisfy a threshold value (the throughput level of the minimum signal required at the specific node, the time delay of the maximum signal, and the like) regarding the specific node (terminal).

PRIOR ART DOCUMENTS

Patent Documents

Patent Document 1: JP 2005-12725
Patent Document 2: JP 2006-211362
Patent Document 3: JP 2007-74210
Patent Document 4: JP 2007-235782
Patent Document 5: JP 2009-296579

SUMMARY OF INVENTION

Problem to be Solved by the Invention

Incidentally, considering the wireless LAN system which introduces a priority control scheme based on class classification, there is a problem in that, when a mass of traffic exists in the categories having the priority of the same class, the collision of packets increases in the traffic, which leads to the increase of the amount of delay and the reduction of throughput.

The first conventional technology is aimed at realizing the impartiality of the upward/downward ratio by dynamically changing the QoS parameters (AIFS, CWmin, and CWmax), and fails to deal with the problem described above.

Also, the second conventional technology is merely aimed at setting different CWmin and CWmax for the QoS parameters regarding the plurality of SSIDs, and similarly fails to deal with the problem described above.

Also, the third conventional technology is aimed at determining the validity of data transmission request of the category (AC_VO) having the highest priority, and similarly fails to deal with the problem described above.

Also, the fourth conventional technology is aimed at carrying out the priority control in accordance with each quality characteristic with respect to video conferences and video streams, and similarly fails to deal with the problem described above.

Also, the fifth conventional technology is a specialized technology suitable for terminals of a specific use (for example, medical instrument), and similarly fails to deal with the problem described above.

Therefore, it is an object of the present invention to avoid the collision of packets in the traffic, the increase of the amount of delay, the reduction of throughput, and the like, even when a mass of traffic exists in the categories having the priority of the same class.

Means for Solving the Problem

According to one aspect of the present invention, with respect to a wireless LAN communication device configured to carry out the priority control of an EDCA scheme, the wireless LAN communication device may include a first determining section configured to determine access categories, a second determining section configured to determine a bandwidth occupancy rate for each access category, and a change section configured to dynamically change parameters regarding the priority control for each category in accordance with determination results of the first determining section and the second determining section.

Effect of the Invention

According to one aspect of the present invention, even when a mass of traffic exists in the categories having the priority of the same class, the collision of packets in the traffic, the increase of the amount of delay, the reduction of throughput, and the like can be avoided.

BRIEF DESCRIPTION OF DRAWINGS

FIG. 3 is a table illustrating specified values (default values) of QoS parameters for each category.

DESCRIPTION OF EMBODIMENTS

Figure 1:
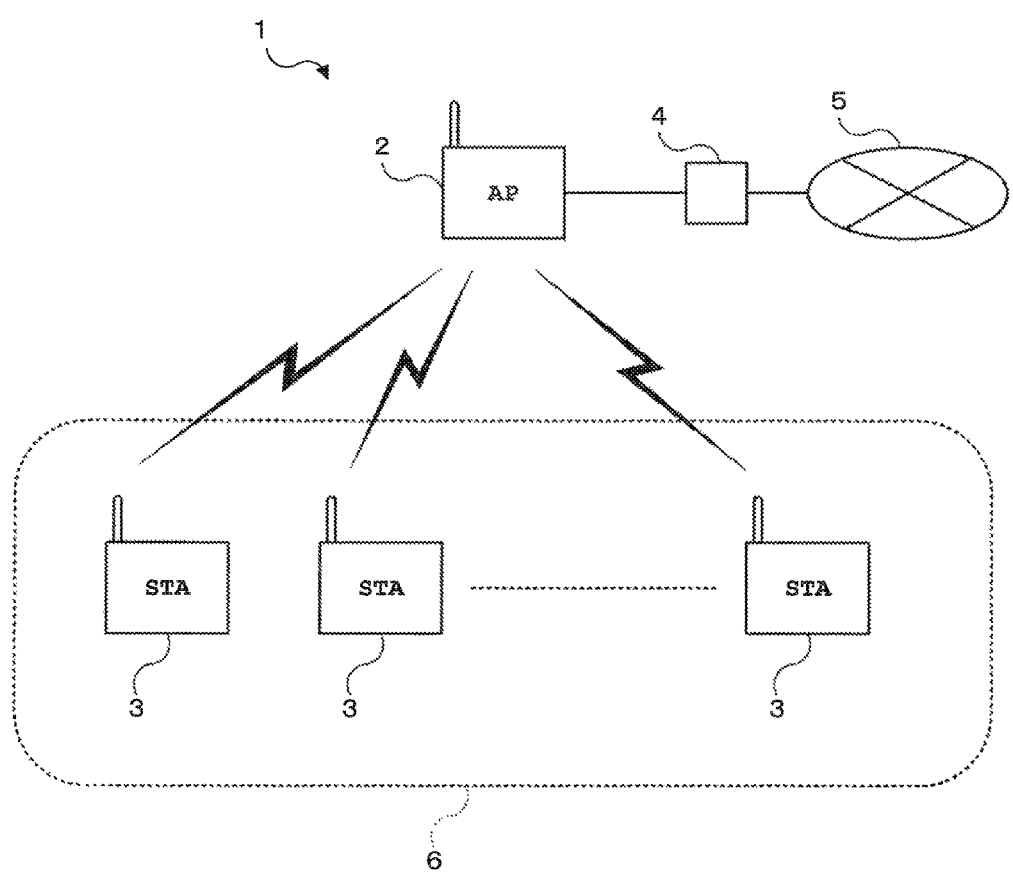
FIG. 1 is a configuration diagram of a wireless LAN system of the embodiment of the present invention.

Hereinafter, the embodiment of the present invention will be described below referring to the drawings.

FIG. 1 is a configuration diagram of a wireless LAN system of the embodiment of the present invention. In the diagram, a wireless LAN system 1 includes, at least, a unit of AP (access point) 2 and a unit or a plurality of STAs (node or terminal) 3.

The AP 2 is connected to a network 5 like the Internet via a router 4. The AP 2 is wirelessly connected to the STAs 3 which are disposed in a predetermined communication area 6 and relays the reception and transmission of packet data (hereinafter merely referred to as data) between the STAs 3 and the network 5.

Although the AP 2 and the router 4 are separately illustrated in the diagram, an AP of an integrated type (AP of a router built-in type) may be applied. Similarly, the STA 3 may be an independent device or a built-in type or an external-type device mounted on a personal computer, or a circuit and substrate corresponding to the STA 3.

Figure 2:
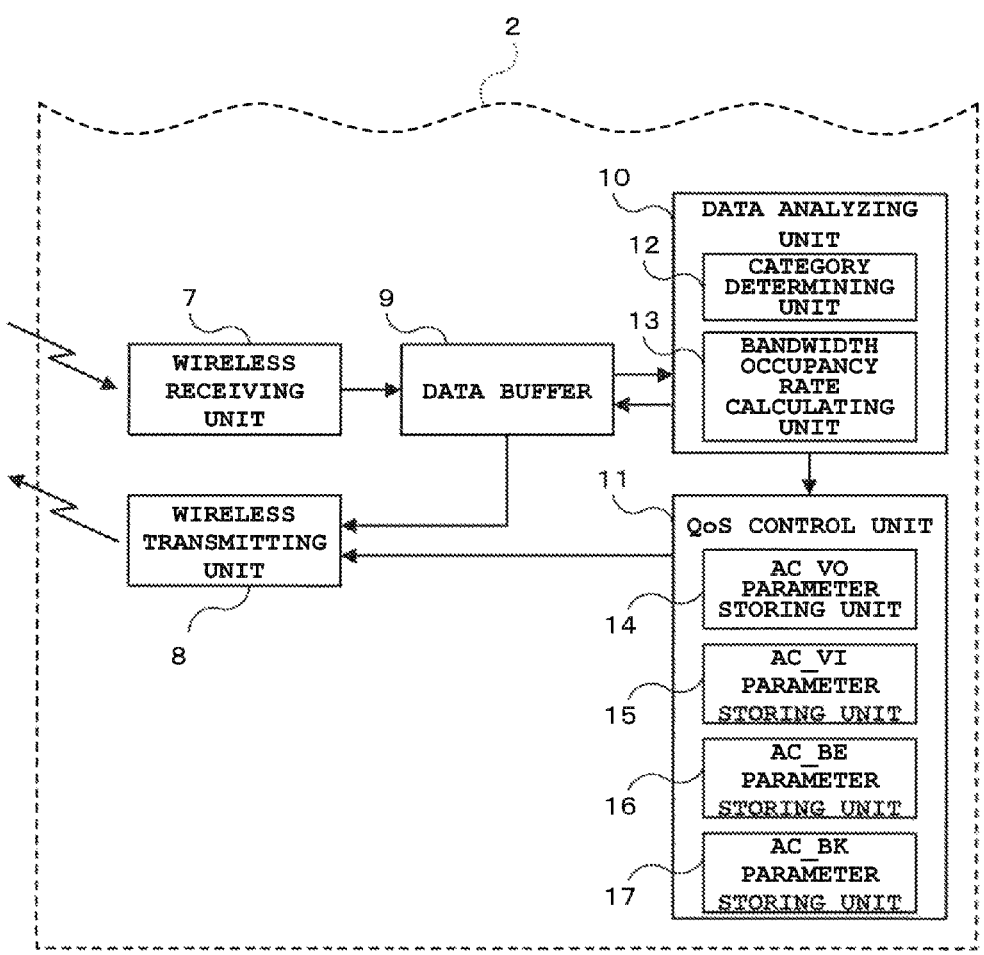
FIG. 2 is a configuration diagram of an AP 2 conceptually illustrated.

FIG. 2 is a diagram illustrating the conceptual configuration of the AP 2. In the diagram, the AP 2 includes a wireless receiving unit 7, a wireless transmitting unit 8, a data buffer 9, a data analyzing unit 10, and a QoS control unit 11. The data analyzing unit 10 includes a category determining unit 12, a bandwidth occupancy rate calculating unit 13, and the like. The QoS control unit 11 includes QoS parameter storing units for each category, that is, an AC_VO parameter storing unit 14, an AC_VI parameter storing unit 15, an AC_BE parameter storing unit 16, and an AC_BK parameter storing unit 17. Incidentally, the data analyzing unit 10 and the QoS control unit 11 are illustrated in a block diagram for the sake of convenience. Actually, the data analyzing unit 10 and the QoS control unit 11 are functionally realized by an organic linkage between hardware elements, such as CPU (computer) and peripheral circuits, and software elements such as control programs.

The wireless receiving unit 7 receives data from the STAs 3 disposed in the communication area 6, and the wireless transmitting unit 8 transmits the data to the STAs 3. Hereinafter, the data received by the wireless receiving unit 7 is referred to as "upward data", and the data transmitted from the wireless transmitting unit 8 is referred to as "downward data".

There are two types of downward data, one of which is transmitted to a specific STA 3 as a destination and the other of which has no designated destination (so-called broadcast). The downward data of the latter is referred to as a beacon (or beacon signal). The AP 2 periodically transmits the beacon in a predetermined cycle. The beacon includes QoS parameters for each category (AC_VO, AC_VI, AC_BE, and AC_BK), in addition to connection information such as an identification name (ESS-ID) and authentication method of the AP 2. The STA 3 seizes the beacon, determines the AP 2 as a connection destination, and sets the authentication method or the QoS parameters. It is noted that the configuration of the STA 3 is similar to the configuration of the AP 2. There are differences in that the data analyzing unit 10 does not exist in the STA 3 and in that the QoS control unit 11 of the STA 3 rewrites the QoS parameters based on the QoS parameters included in the beacon from the AP 2.

The data buffer 9 temporarily retains the upward data. The data analyzing unit 10 analyzes data communication elements such as data category determination and calculation of bandwidth occupancy rates based on the upward data temporarily retained in the data buffer 9, outputs the analysis results to the QoS control unit 11, and notifies the data buffer 9 of the completion of analysis. The data buffer 9 determines the timing of data transmission in response to the notice of the completion of analysis and transmits the data, which is temporarily retained, from the wireless transmitting unit 8.

The QoS control unit 11 executes the resetting of the QoS parameters for each category based on a determination algorithm described later (see FIG. 4) in accordance with the analysis results from the data analyzing unit 10, stores its results in the QoS storing units for each category (AC_VO parameter storing unit 14, AC_VI parameter storing unit 15, AC_BE parameter storing unit 16, and AC_BK parameter storing unit 17), and transmits these QoS parameters carried on the beacon from the wireless transmitting unit 8.

FIG. 3 is a table illustrating the specified values (default value) of the QoS parameters for each category. In the table, AC represents categories, and CWmin represents the minimum value of contention window (CW), and CWmax represents the maximum value of the contention window (CW), and AIFSN represents a frame transmission interval (AIFS: Arbitration Inter-Frame Space) Number, TXOP (Transmission Opportunity) Limit represents the occupancy time regarding a right to transmit.

As is described above, the QoS parameters illustrated are the specified values defined by IEEE 802.11e. At the beginning, these specified values are stored in the QoS storing units (AC_VO parameter storing unit 14, AC_VI parameter storing unit 15, AC_BE parameter storing unit 16, and AC_BK parameter storing unit 17) for each category according to the QoS control unit 11, but these specified values are dynamically changed based on the determination algorithm described later in the embodiment of the present invention.

The QoS parameters will be described in detail.

<CW>

The CW represents a collision avoidance control period (time). The CW represents a period to the effect that, when use channel is busy (in use) at the time of starting the data transmission, or the data is retransmitted, the data transmission is awaited during a random time after the use channel has been in a unused state, in order to avoid the collision with the data transmission from other terminals. The random time is provided for reducing the probability of a collision and determined based on a backoff algorithm. A backoff time is determined by multiplying a constant time by the value of random numbers, and the constant time is represented as a slot time. That is, "backoff time=value of random numbers×slot time" holds. The values of random numbers are represented as a random integer (variable value) generated in a range of 0 to CW, and its minimum value is the CWmin, and its maximum is the CWmax. That is, "CWmin≤CW≤CWmax" holds. The value of the CW exponentially increases in accordance with the following formula (1) every time frames are collided with each other and retransmitted, and after the value of the CW reaches the CWmax, the CW leads to a constant value.

$$CW=(CWmin+1)\times 2^n - 1 \text{ (}n\text{ represents the number of retransmissions)} \quad (1)$$

Thus, a terminal having the shortest wait time (backoff time) first obtains the right to transmit, thereby preferentially transmitting the frames.

<AIFS>

The AIFS is a frame transmission interval. The start time of the backoff algorithm is moved forward as the frame transmission interval becomes shorter, which consequently raises the priority of queue. As is described above, according to IEEE 802.11e, transmission data for QoS control is divided into four categories, and the priority is controlled by changing an AIFS time in each category. The AIFS corresponds to DIFS (DCF IFS) in IEEE 802.11 standard access mode, which is defined by the following formula (2).

$$AIFS=AIFSN\times aSlotTime+SIFS \quad (2)$$

Incidentally, the AIFSN (AIFS number) is the value of an integer of two or more. The aSlotTime (slot time), which depends on wireless modes, is 9 μsec according to IEEE 802.11b. The SIFS (Short IFS), which depends on wireless modes, is 10 μsec according to IEEE 802.11b mode. In the case of AIFSN=2, the AIFS becomes equal to the DIFS (Distributed IFS: frame interval for distributed control).

<TXOP Limit>

TXOP Limit represents a time to be occupied in a case where the AC obtains the right to transmit. The longer the time is, the more the frames can be transmitted based on the right to transmit that has been obtained once. In contrast, there is a defect in that the real time property of the AC is impaired. Also, the higher priority does not always provide the longer time. In the case where the AC_BE and AC_BK are "TXOP Limit=0", one piece of frame can be transmitted based on one-time right to transmit.

Next, the operation of resetting for QoS parameters for each category will be described.

Figure 4:
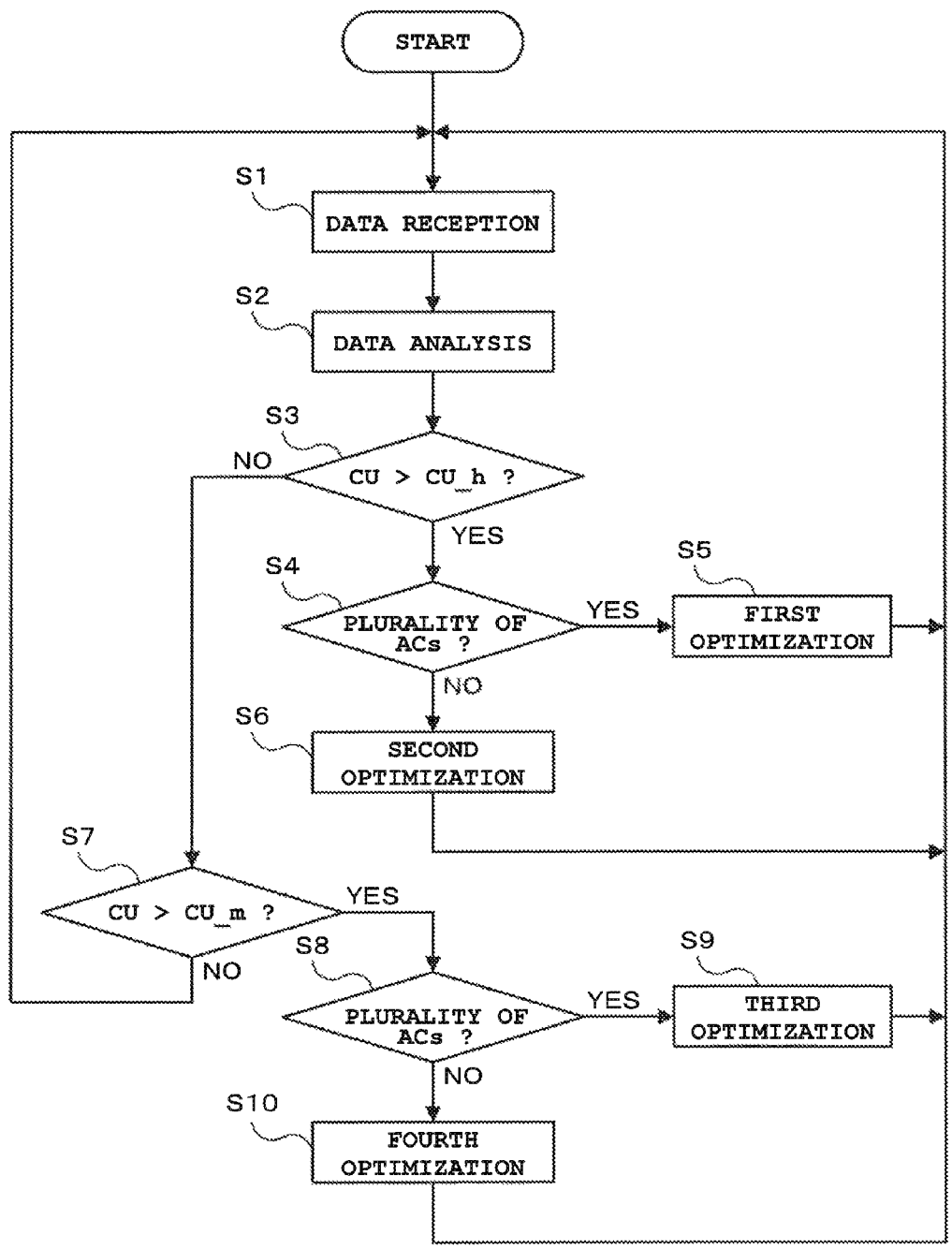
FIG. 4 is a flowchart illustrating a sequence of a determination algorithm to reset the QoS parameters for each category.

FIG. 4 is a flowchart illustrating a sequence of the determination algorithm to reset the QoS parameters for each category. In this sequence, first, when the data from the STA 3 is temporarily stored in the buffer 9 (Step S1), the analysis of data communication elements, such as category determination and calculation of bandwidth occupancy rates regarding the data temporarily stored, are made by the data analyzing unit 10 (Step S2), and after the completion of the analysis, the process of resetting for the QoS parameters is carried out by the QoS control unit 11 (Step S3 to Step S10).

<Divergence of Bandwidth Occupancy Rate>

First, it is determined whether the bandwidth occupancy rate is equal to or higher than a predetermined first bandwidth occupancy rate (CU_h) (Step S3). Herein, the bandwidth occupancy rate is a rate calculated by the bandwidth occupancy rate calculating unit 13 in the case where the analysis of the data communication elements is made by the data analyzing unit 10. The bandwidth occupancy rate corresponds to a value (CU value) set in the CU (Channel Utilization) field of QBSS Load field of the beacon. The CU is represented by a carrier sense mechanism, and the CU value is defined according to IEEE 802.11 and provided based on the following formula (3).

$$CU\ value=((A/(B\times C\times 1024))\times 255) \quad (3)$$

Incidentally, A represents "channel busy time", and B represents "dot11ChannelUtilizationBeaconIntervals", and C represents "dot11BeaconPeriod". The default value of B is 50, and the default value of C is a beacon period value.

According to the formula (3), the CU value becomes a value obtained by normalizing the bandwidth occupancy rate at 0 to 255. For example, supposing that the bandwidth occupancy rate is 100%, the CU value is 255. The first bandwidth occupancy rate (CU_h) represents the CU value corresponding to a substantially high bandwidth occupancy rate (for example, approximately 70%).

When the bandwidth occupancy rate is not equal to or higher than the predetermined first bandwidth occupancy rate (CU_h), that is, when the determination result of Step S3 is NO, subsequently, it is determined whether the bandwidth occupancy rate is equal to or higher than a second bandwidth occupancy rate (CU_m) which is lower than the first bandwidth occupancy rate (CU_h) (Step S7). The second occupancy rate (CU_m) represents the CU value corresponding to a slightly high bandwidth occupancy rate (for example, approximately 50%).

As is described above, based on two determinations (Step S3 and Step S7), three determination results are obtained that include "a high bandwidth occupancy state" which is equal to or higher than the first bandwidth occupancy rate (CU_h), "a medium bandwidth occupancy state" which is equal to or lower than the first bandwidth occupancy rate (CU_h) and is equal to or higher than the second bandwidth occupancy rate (CU_m), and "a low bandwidth occupancy state" which is equal to or lower than the second bandwidth occupancy rate (CU_m).

<Process in Case of High Bandwidth Occupancy State>

It is determined whether flowing traffic is the traffic regarding a plurality of categories (AC) (Step S4). Then, when the flowing traffic is the traffic regarding the plurality of categories, a first optimization is carried out (Step S5). When the flowing traffic is not the traffic regarding the plurality of categories, a second optimization is carried out (Step S6). In any of the cases, the process returns to the Step S1 after the execution of the optimization. The first and second optimizations will be described later.

<Process in Case of Medium Bandwidth Occupancy State>

Likewise, it is determined whether the flowing traffic is the traffic regarding the plurality of categories (AC) (Step S8). Then, when the flowing traffic is the traffic regarding the plurality of categories, a third optimization is carried out (Step S9). When the flowing traffic is not the traffic regarding the plurality of categories, a fourth optimization is carried out (Step S10). In any of the cases, the process returns to the Step S1 after the execution of the optimization. The third and fourth optimizations will also be described later.

<Process in Case of Low Bandwidth Occupancy State>

In this case, the process returns to the Step S1 as it is, that is, the process of resetting for the QoS parameter is not executed.

Next, the first to fourth optimizations will be described.

<First Optimization>

The first optimization is applied to a case where the CU value is larger than the first bandwidth occupancy rate (CU_h), and the flowing traffic is the traffic regarding the plurality of categories (AC). In this first optimization, the CWmin and CWmax of each category (AC) are temporarily increased only by a predetermined value ($\alpha$). Accordingly, the range of the CW is extended by a, and a random property is enhanced, thereby avoiding the collision. Incidentally, when the CW is extended from the start, a delay in resetting is reduced, which seems to be desirable. However, this measure is not a good scheme because a delay in a backoff portion increases. Also, in the first optimization, the AIFSN is set larger only by a predetermined value (for example, +1) than the default value, with respect to AC_VI, AC_BE, and AC_BK. Accordingly, the effect of bringing forward the opportunity for transmission of the traffic having a high priority is expected.

<Second Optimization>

The second optimization is applied to a case where the CU value is larger than the first bandwidth occupancy rate (CU_h), and the flowing traffic is not the traffic regarding the plurality of categories (AC). In the second optimization, the only CWmin of the category (AC) regarding the flowing data is temporarily increased only by the predetermined value ($\alpha$). Accordingly, the range of CW is extended by a, and the random property is enhanced, thereby avoiding the collision.

<Third Optimization>

The third optimization is applied to a case where the CU value is equal to or lower than the first bandwidth occupancy rate (CU_h) and equal to or higher than the second bandwidth occupancy rate (CU_m), and the flowing traffic is the traffic regarding the plurality of categories (AC). As is the same with the first optimization, in this third optimization, the CWmin and CWmax of each category (AC) are temporarily increased by a predetermined value ($\beta$), as an amount of increase, which is lower than the predetermined value ($\alpha$) in the first optimization. Accordingly, the range of CW is extended to some extent, and the random property is enhanced, thereby avoiding the collision. Further, as is the same with the first optimization, the AIFSN is set larger only by a predetermined value (for example, +1) than the default value, with respect to AC_VI, AC_BE, and AC_BK. Accordingly, the effect of bringing forward the opportunity for transmission of the traffic having a high priority is expected.

<Fourth Optimization>

The fourth optimization is applied to a case where the CU value is equal to or lower than the first bandwidth occupancy rate (CU_h) and equal to or higher than the second bandwidth occupancy rate (CU_m), and the flowing traffic is not the traffic regarding the plurality of categories (AC). As is the same with the second optimization, in this fourth optimization, the only CWmin of the category (AC) of the flowing data is temporarily increased by the predetermined value ($\beta$), as an amount of increase, which is lower than the predetermined value ($\alpha$) in the second optimization.

As is described above, in the embodiment of the present invention, the bandwidth occupancy rates are classified into three states such as "the high bandwidth occupancy state", "the medium bandwidth occupancy state", and "the low bandwidth occupancy state", in accordance with the bandwidth occupancy rate for each actual access category, and further, it is determined whether the flowing traffic is the traffic regarding the plurality of categories (AC), with respect to each of the former two states (the high bandwidth occupancy state and the medium bandwidth occupancy state) which include a possibility of a data collision. In accordance with these determination results, "the first optimization", "the second optimization", "the third optimization", and "the fourth optimization" are selectively applied, and the resetting of the QoS parameters for each category (AC) is carried out, so that the following effects can be achieved.

(1) The QoS parameters set in the AP 2 are dynamically changed corresponding to the service category and the bandwidth occupancy rate of the STA 3 to be connected, so that, for example, even when a mass of traffic exists in the categories having the priority of the same class, the collision of packets in the traffic, the increase of the amount of delay, and the reduction of throughput can be avoided.

(2) Also, in view of the avoidance of the data collision, it is only necessary to increase the QoS parameters (in particular, CW) from the start. However, on the other hand, the delay in the backoff portion is increased, which causes inconvenience of reducing the data transmission efficiency. According to the embodiment of the present invention, the QoS parameters are dynamically changed corresponding to the service category and the bandwidth occupancy rate of the STA 3 to be connected, which does not lead to the above-mentioned inconvenience and makes it possible to avoid the data collision.

(3) Further, it is determined that what category (AC) includes a high bandwidth occupancy rate, thereby optimizing the QoS parameters for each category (AC). For example, even when the traffic concentrates in a specific category, the QoS parameters for the category are appropriately adjusted, thereby avoiding unnecessary collisions and retransmissions.

Hereinafter, various modes of the present invention will be described en masse as supplementary notes.

(Supplementary Note 1)

Figure 5:
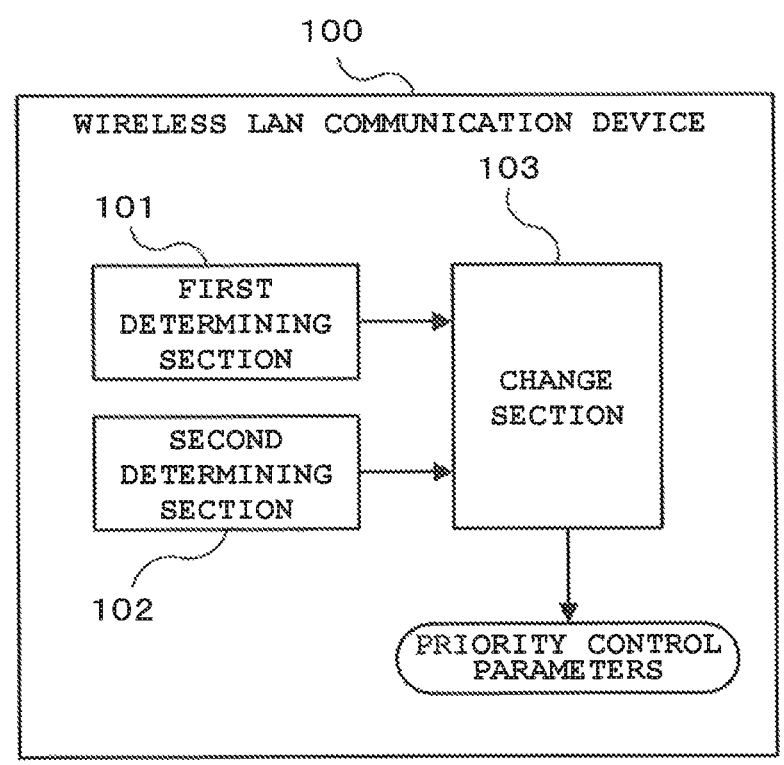
FIG. 5 is a diagram illustrating the configuration of Supplementary Note 1.

FIG. 5 is a diagram illustrating the configuration of Supplementary Note 1.

With respect to a wireless LAN communication (100) device configured to carryout the priority control of an EDCA scheme, a wireless LAN communication device described in the Supplementary Note 1 includes a first determining section (101) configured to determine access categories, a second determining section (102) configured to determine a bandwidth occupancy rate for each access category, and a change section (103) configured to dynamically change parameters regarding the priority control for each category in accordance with determination results of the first determining section (101) and the second determining section (102).

According to the Supplementary Note 1, even when a mass of traffic exists in the categories having the priority of the same class, the collision of packets in the traffic, the increase of the amount of delay, the reduction of throughput, and the like can be avoided.
(Supplementary Note 2)

With respect to the wireless LAN communication device according to the Supplementary Note 1, the wireless LAN communication device described in the Supplementary Note 2 is such that, in a case where there are a plurality of categories to be determined by the first determining section, when the bandwidth occupancy rate determined by the second determining section is equal to or higher than a first bandwidth occupancy rate, the change section executes a first optimization, and in contrast, when the bandwidth occupancy rate determined by the second determining section is equal to or lower than the first bandwidth occupancy rate and equal to or higher than a second bandwidth occupancy rate, the change section executes a second optimization, and wherein the change section temporarily increases, at least, a CWmin and a CWmax of the parameters regarding the priority control only by a predetermined value (α) in the first optimization and the second optimization.

According to the Supplementary Note 2, the CWmin and the CWmax for each category (AC) are temporarily increased only by the predetermined value (α), so that the range of the CW is extended by a, and the random property is enhanced, thereby avoiding the collision.
(Supplementary Note 3)

With respect to the wireless LAN communication device according to the Supplementary Note 1, the wireless LAN communication device described in the Supplementary Note 3 is such that, in a case where there are no plurality of categories to be determined by the first determining section, when the bandwidth occupancy rate determined by the second determining section is equal to or higher than a first bandwidth occupancy rate, the change section executes a third optimization, and in contrast, when the bandwidth occupancy rate determined by the second determining section is equal to or lower than the first bandwidth occupancy rate and equal to or higher than a second bandwidth occupancy rate, the change section executes a fourth optimization, and wherein the change section temporarily increases, at least, a CWmin and a CWmax of the parameters regarding the priority control only by a predetermined value (β) in the third optimization and the fourth optimization.

According to the Supplementary Note 3, the CWmin and the CWmax for each category (AC) are temporarily increased only by the predetermined value (β), so that the range of the CW is extended by β, and the random property is enhanced, thereby avoiding the collision.
(Supplementary Note 4) With respect to the wireless LAN communication device according to the Supplementary Note 2, the wireless LAN communication device described in the Supplementary Note 4 is such that, in the first optimization, an AIFSN included in the parameters regarding the priority control is set larger only by a predetermined value than a default value, with respect to respective categories of AC_VI, AC_BE, and AC_BK.

According to the Supplementary Note 4, the AIFSN is set larger only by the predetermined value than the default value, with respect to the AC_VI, AC_BE, and AC_BK, the effect of bringing forward the opportunity for transmission of the traffic having a high priority (AC_VO) can be expected.
(Supplementary Note 5)

With respect to the wireless LAN communication device according to the Supplementary Note 3, the wireless LAN communication device described in the Supplementary Note 5 is such that, in the third optimization, the AIFSN included in the parameters regarding the priority control is set larger only by a predetermined value than a default value, with respect to respective categories of the AC_VI, AC_BE, and AC_BK.

According to the Supplementary Note 5, the AIFSN is set larger only by the predetermined value than the default value, with respect to the AC_VI, AC_BE, and AC_BK, the effect of bringing forward the opportunity for transmission of the traffic having a high priority (AC_VO) can be expected.
(Supplementary Note 6)

With respect to a wireless LAN communication method for carrying out priority control of an EDCA scheme, the wireless LAN communication method described in the Supplementary Note 6 includes a first determining step of determining access categories, a second determining step of determining a bandwidth occupancy rate for each access category, and a change step of dynamically changing parameters regarding the priority control for each category in accordance with determination results of the first determining step and the second determining step.

According to the Supplementary Note 6, as is the same with the Supplementary Note 1, even when a mass of traffic exists in the categories having the priority of the same class, the collision of packets in the traffic, the increase of the amount of delay, the reduction of throughput, and the like can be avoided.
(Supplementary Note 7)

A program described in the Supplementary Note 7 provides a computer of a wireless LAN communication device configured to carry out priority control of an EDCA scheme with functions as a first determining section configured to determine access categories, a second determining section configured to determine a bandwidth occupancy rate for each access category, and a change section configured to dynamically change parameters regarding the priority control for each category in accordance with determination results of the first determining section and the second determining section.

According to the Supplementary Note 7, the functions of the Supplementary Note 1 can be provided in the form of the program.

DESCRIPTION OF REFERENCE NUMERALS

2 AP (wireless LAN communication device)
3 STA (wireless LAN communication device)
11 QoS control unit (change section)
12 category determining unit (first determining section)
13 bandwidth occupancy rate calculating unit (second determining section)
100 wireless LAN communication device
101 first determining section
102 second determining section
103 change section

The invention claimed is:
1. A wireless LAN communication device configured to carry out priority control of an EDCA scheme, the wireless LAN communication device comprising a computer to carry out functions comprising:

a first determining section configured to determine access categories;

a second determining section configured to determine a bandwidth occupancy rate for each access category; and a change section configured to dynamically change parameters regarding the priority control for each category in accordance with determination results of the first determining section and the second determining section, wherein, in the event the bandwidth occupancy rate determined by the second determining section is equal to or higher than a first bandwidth occupancy rate, when there are a plurality of categories to be determined by the first determining section, the change section executes a first optimization in which the change section temporarily increases both of a CWmin and a CWmax of the parameters regarding the priority control only by a predetermined value ($\alpha$), and when there are no plurality of categories to be determined by the first determining section, the change section executes a second optimization in which the change section temporarily increases only the CWmin of the parameters regarding the priority control only by the predetermined value ($\alpha$), and wherein, in the event the bandwidth occupancy rate determined by the second determining section is equal to or lower than the first bandwidth occupancy rate and equal to or higher than a second bandwidth occupancy rate, when there are a plurality of categories to be determined by the first determining section, the change section executes a third optimization in which the change section temporarily increases both of the CWmin and the CWmax of the parameters regarding the priority control only by a predetermined value ($\beta$), and when there are no plurality of categories to be determined by the first determining section, the change section executes a fourth optimization in which the change section temporarily increases only the CWmin of the parameters regarding the priority control only by the predetermined value ($\beta$).

2. The wireless LAN communication device according to claim 1, wherein, in the first optimization, an AIFSN included in the parameters regarding the priority control is set larger only by a predetermined value than a default value, with respect to respective categories of AC_VI, AC_BE, and AC_BK.

3. The wireless LAN communication device according to claim 1, wherein the third optimization, an AIFSN included in the parameters regarding the priority control is set larger only by a predetermined value than a default value, with respect to respective categories of AC_VI, AC_BE, and AC_BK.

4. The wireless LAN communication device according to claim 1, wherein the predetermined value ($\alpha$) is greater than the predetermined value ($\beta$).

5. A wireless LAN communication method for carrying out priority control of an EDCA scheme, the wireless LAN communication method comprising:

a first determining step of determining access categories;

a second determining step of determining a bandwidth occupancy rate for each access category; and a change step of dynamically changing parameters regarding the priority control for each category in accordance with determination results of the first determining step and the second determining step, wherein, in the event the bandwidth occupancy rate determined by the second determining step is equal to or higher than a first bandwidth occupancy rate, when there are a plurality of categories to be determined by the first determining step, the change step executes a first optimization in which the change step temporarily increases both of a CWmin and a CWmax of the parameters regarding the priority control only by a predetermined value ($\alpha$), and when there are no plurality of categories to be determined by the first determining step, the change step executes a second optimization in which the change step temporarily increases only the CWmin of the parameters regarding the priority control only by the predetermined value ($\alpha$), and wherein, in the event the bandwidth occupancy rate determined by the second determining step is equal to or lower than the first bandwidth occupancy rate and equal to or higher than a second bandwidth occupancy rate, when there are a plurality of categories to be determined by the first determining step, the change step executes a third optimization in which the change step temporarily increases both of the CWmin and the CWmax of the parameters regarding the priority control only by a predetermined value ($\beta$), and when there are no plurality of categories to be determined by the first determining step, the change step executes a fourth optimization in which the change step temporarily increases only the CWmin of the parameters regarding the priority control only by the predetermined value ($\beta$).

6. The wireless LAN communication method according to claim 5, wherein the predetermined value ($\alpha$) is greater than the predetermined value ($\beta$).

7. A non-transitory computer-readable storage medium having stored thereon a program that is executable by a computer of a wireless LAN communication device configured to carry out priority control of an EDCA scheme with functions, the program including the functions comprising:

a first determining section configured to determine access categories;

a second determining section configured to determine a bandwidth occupancy rate for each access category; and a change section configured to dynamically change parameters regarding the priority control for each category in accordance with determination results of the first determining section and the second determining section wherein, in the event the bandwidth occupancy rate determined by the second determining section is equal to or higher than a first bandwidth occupancy rate, when there are a plurality of categories to be determined by the first determining section, the change section executes a first optimization in which the change section temporarily increases both of a CWmin and a CWmax of the parameters regarding the priority control only by a predetermined value ($\alpha$), and when there are no plurality of categories to be determined by the first determining section, the change section executes a second optimization in which the change section temporarily increases only the CWmin of the parameters regarding the priority control only by the predetermined value ($\alpha$), and wherein, in the event the bandwidth occupancy rate determined by the second determining section is equal to or lower than the first bandwidth occupancy rate and equal to or higher than a second bandwidth occupancy rate, when there are a plurality of categories to be determined by the first determining section, the change section executes a third optimization in which the change section temporarily increases both of the CWmin and the CWmax of the parameters regarding the priority control only by a predetermined value ($\beta$), and when there are no plurality of categories to be determined by the first determining section, the change section executes a fourth optimization in which the change section temporarily increases only the CWmin of the parameters regarding the priority control only by the predetermined value ($\beta$).

8. The storage medium according to claim 7, wherein the predetermined value ($\alpha$) is greater than the predetermined value ($\beta$).

* * * * *